(12) United States Patent
Chapin et al.

(10) Patent No.: US 11,365,829 B2
(45) Date of Patent: Jun. 21, 2022

(54) FLOW CONTROL VALVE

(71) Applicant: Parker-Hannifin Corporation, Cleveland, OH (US)

(72) Inventors: Donal R. Chapin, Powell, OH (US); Steven Ware, Lorain, OH (US); Christopher J. Webber, North Royalton, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 139 days.

(21) Appl. No.: 16/704,332

(22) Filed: Dec. 5, 2019

(65) Prior Publication Data

US 2020/0191298 A1 Jun. 18, 2020

Related U.S. Application Data

(60) Provisional application No. 62/778,366, filed on Dec. 12, 2018.

(51) Int. Cl.
*F16K 31/50* (2006.01)
*F15B 15/06* (2006.01)
*F16K 1/42* (2006.01)

(52) U.S. Cl.
CPC .......... *F16K 31/504* (2013.01); *F15B 15/06* (2013.01); *F16K 1/422* (2013.01); *F16K 31/502* (2013.01)

(58) Field of Classification Search
CPC ...... F16K 31/504; F16K 31/502; F16K 31/60; F16K 1/422; F16K 1/04; F16K 43/001; F16K 41/14; F15B 15/06
See application file for complete search history.

(56) References Cited

U.S. PATENT DOCUMENTS 2,234,052 A * 3/1941 Luenz .................. F16K 35/00
 137/556.3
3,085,592 A * 4/1963 Zajac .................. F16K 15/18
 137/556
(Continued)

FOREIGN PATENT DOCUMENTS

EP 0581034 A1 2/1994
EP 1217271 A1 * 6/2002 .......... F16K 15/063
(Continued)

OTHER PUBLICATIONS

Extended European Search Report prepared by the European Patent Office in application No. EP 19 21 4762.7 dated Mar. 13, 2020.

*Primary Examiner* — Mary E McManmon
*Assistant Examiner* — Andrew J Rost
(74) *Attorney, Agent, or Firm* — McDonnell Boehnen Hulbert & Berghoff LLP

(57) ABSTRACT

An example assembly includes: a valve body having a cavity therein, wherein the valve body comprises internal threads formed in a first-handed direction and an external feature; a knob having an internal feature configured to engage with the external feature of the valve body to allow the internal feature of the knob to move past the external feature of the valve body in a linear direction when assembling the knob on the valve body; and a needle disposed in the cavity of the valve body and having external threads formed in the first-handed direction and engaging with the internal threads of the valve body, the needle being coupled to the knob such that rotation of the knob and the needle results in linear movement of the needle within the valve body due to engagement of the external threads of the needle with the internal threads of the valve body.

19 Claims, 5 Drawing Sheets

(56) References Cited

U.S. PATENT DOCUMENTS

| | | | |
|---|---|---|---|
| 3,334,654 A | 8/1967 | Donner | |
| 3,434,694 A * | 3/1969 | Skinner | F16K 1/04 |
| | | | 251/215 |
| 3,985,332 A | 10/1976 | Walker | |
| 4,099,703 A * | 7/1978 | Lush | F16K 1/38 |
| | | | 251/122 |
| 4,693,269 A * | 9/1987 | Yamada | F16K 15/033 |
| | | | 137/484.2 |
| 7,178,786 B2 * | 2/2007 | Turnau, III | F16K 31/60 |
| | | | 251/309 |
| 9,347,578 B2 * | 5/2016 | Dang | F16K 15/063 |
| 2015/0362089 A1 | 12/2015 | Fukushima | |
| 2016/0040787 A1* | 2/2016 | McGuigan | F16K 31/506 |
| | | | 137/315.27 |
| 2016/0186888 A1* | 6/2016 | Cassel | F16K 37/00 |
| | | | 137/15.18 |

FOREIGN PATENT DOCUMENTS

| | | |
|---|---|---|
| EP | 2487396 B1 | 8/2012 |
| EP | 2 527 696 A1 | 11/2012 |
| GB | 880562 | 10/1961 |
| GB | 1401614 | 7/1975 |

\* cited by examiner

700

```
┌─────────────────────────────────────────────────────────────┐
│ PLACING A NEEDLE OF A VALVE INTO A VALVE BODY OF THE VALVE, │
│ WHEREIN THE NEEDLE COMPRISES EXTERNAL THREADS FORMED IN A   │
│ FIRST-HANDED DIRECTION, WHEREIN THE VALVE BODY COMPRISES    │── 702
│ INTERNAL THREADS FORMED IN THE FIRST-HANDED DIRECTION,      │
│ WHEREIN THE VALVE BODY FURTHER COMPRISES RESPECTIVE         │
│ EXTERNAL THREADS FORMED IN A SECOND-HANDED DIRECTION        │
└─────────────────────────────────────────────────────────────┘
                              │
                              ▼
┌─────────────────────────────────────────────────────────────┐
│ ROTATING THE NEEDLE IN A FIRST DIRECTION, THEREBY CAUSING THE│
│ EXTERNAL THREADS OF THE NEEDLE TO ENGAGE THE INTERNAL        │
│ THREADS OF THE VALVE BODY TO MOVE THE NEEDLE IN A LINEAR     │── 704
│ DIRECTION TO A PREDETERMINED POSITION WITH RESPECT TO THE    │
│ VALVE BODY                                                   │
└─────────────────────────────────────────────────────────────┘
                              │
                              ▼
┌─────────────────────────────────────────────────────────────┐
│ POSITIONING A KNOB OF THE VALVE ONTO THE VALVE BODY, WHEREIN │
│ THE KNOB COMPRISES RESPECTIVE INTERNAL THREADS FORMED IN     │── 706
│ THE SECOND-HANDED DIRECTION                                  │
└─────────────────────────────────────────────────────────────┘
                              │
                              ▼
┌─────────────────────────────────────────────────────────────┐
│ ROTATING THE KNOB IN A SECOND DIRECTION SUCH THAT THE        │
│ RESPECTIVE INTERNAL THREADS OF THE KNOB ENGAGE AND PASS      │── 708
│ THROUGH THE RESPECTIVE EXTERNAL THREADS OF THE VALVE BODY    │
└─────────────────────────────────────────────────────────────┘
                              │
                              ▼
┌─────────────────────────────────────────────────────────────┐
│ AFTER THE RESPECTIVE INTERNAL THREADS OF THE KNOB PASS       │
│ THROUGH THE RESPECTIVE EXTERNAL THREADS OF THE VALVE BODY    │
│ AND DISENGAGE THEREFROM, ROTATABLY COUPLING THE KNOB TO      │
│ THE NEEDLE SUCH THAT ROTATION OF THE KNOB IN THE FIRST       │── 710
│ DIRECTION CAUSES THE NEEDLE TO ROTATE THEREWITH, THEREBY     │
│ MOVING THE NEEDLE IN THE LINEAR DIRECTION AND ADJUSTING      │
│ POSITION OF THE NEEDLE WITH RESPECT TO THE VALVE BODY        │
└─────────────────────────────────────────────────────────────┘
```

FIG. 7

FLOW CONTROL VALVE

CROSS REFERENCE TO RELATED APPLICATION

The present application claims priority to U.S. Provisional patent application No. 62/778,366, filed on Dec. 12, 2018, and entitled "Flow Control Valve Knob," the entire contents of which are herein incorporated by reference as if fully set forth in this description.

BACKGROUND

A flow control valve regulates the flow or pressure of a fluid. A flow control valve can be configured as a needle valve where a threaded, needle-shaped plunger can be used to control a size of an orifice within a valve body of the valve. By controlling the size of the orifice, the amount of fluid flow rate through the valve can be adjusted as desired. An operator can actuate the valve (e.g., via a handle) to move the needle and either reduce or increase the size of the orifice.

It may be desirable to configured the valve so as to preclude the needle and associated components from being unintentionally disassembled from the valve (e.g., propelled away from the valve under fluid pressure) as the needle is moved. It is with respect to these and other considerations that the disclosure made herein is presented.

SUMMARY

The present disclosure describes implementations that relate to a flow control valve.

In a first example implementation, the present disclosure describes an assembly. The assembly includes: (i) a valve body having a cavity therein, wherein the valve body comprises internal threads formed in a first-handed direction and an external feature; (ii) a knob having an internal feature configured to engage with the external feature of the valve body to allow the internal feature of the knob to move past the external feature of the valve body in a linear direction when assembling the knob on the valve body; and (iii) a needle disposed in the cavity of the valve body and having external threads formed in the first-handed direction and engaging with the internal threads of the valve body, the needle being coupled to the knob such that rotation of the knob and the needle results in linear movement of the needle within the valve body due to engagement of the external threads of the needle with the internal threads of the valve body.

In a second example implementation, the present disclosure describes a valve. The valve includes: (i) a valve body having: (a) a longitudinal body portion having a longitudinal cavity, and (b) a transverse body portion having a transverse cavity, wherein the transverse body portion comprises internal threads formed in a first-handed direction and an external feature; (ii) a knob having an internal feature configured to engage with the external feature of the transverse body portion to allow the internal feature of the knob to move past the external feature of the transverse body portion in a transversal direction when assembling the knob on the valve body; and (iii) a needle disposed in the transverse cavity of the transverse body portion and extending within the longitudinal body portion to form an orifice therein, wherein the needle comprises external threads formed in the first-handed direction and engaging with the internal threads of the transverse body portion, the needle being coupled to the knob such that rotation of the knob and the needle results in transversal movement of the needle within the transverse cavity due to engagement of the external threads of the needle with the internal threads of the transverse body portion, thereby changing a size of the orifice formed within the longitudinal body portion.

In a third example implementation, the present disclosure describes a method of assembling a valve. The method includes: (i) placing a needle of the valve into a valve body of the valve, wherein the needle comprises external threads formed in a first-handed direction, wherein the valve body comprises internal threads formed in the first-handed direction, wherein the valve body further comprises respective external threads formed in a second-handed direction; (ii) rotating the needle in a first direction, thereby causing the external threads of the needle to engage the internal threads of the valve body to move the needle in a linear direction to a predetermined position with respect to the valve body; (iii) positioning a knob of the valve onto the valve body, wherein the knob comprises respective internal threads formed in the second-handed direction; (iv) rotating the knob in a second direction such that the respective internal threads of the knob engage and pass through the respective external threads of the valve body; and (v) after the respective internal threads of the knob pass through the respective external threads of the valve body and disengage therefrom, rotatably coupling the knob to the needle such that rotation of the knob in the first direction causes the needle to rotate therewith, thereby moving the needle in the linear direction and adjusting position of the needle with respect to the valve body.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 7 is a flowchart of a method for assembling a valve, in accordance with an example implementation.

DETAILED DESCRIPTION

In an example flow control valve, a needle can be used to control a size of an orifice within the valve to control the amount of fluid flow rate through the valve. In an example, a knob can be rotatably coupled to the needle and the needle can be threadedly engaged with an internal surface of a valve body. With this configuration, rotating the knob causes the needle to rotate therewith, thereby changing a linear (or axial) position of the needle within the valve body. As the needle moves, the size of the orifice, and thus the fluid flow rate through the valve can be changed.

It is desirable to preclude the knob and needle from coming off or being unintentionally disassembled from the valve body during operation. For example, as pressurized fluid flows through the valve and an operator is unscrewing the knob and needle coupled thereto, the knob and needle might be propelled off the valve body, which is undesirable. Disclosed herein are valves, assemblies, and methods associated with precluding such knob and needle from being disassembled during operation of a flow control valve.

Figure 1:
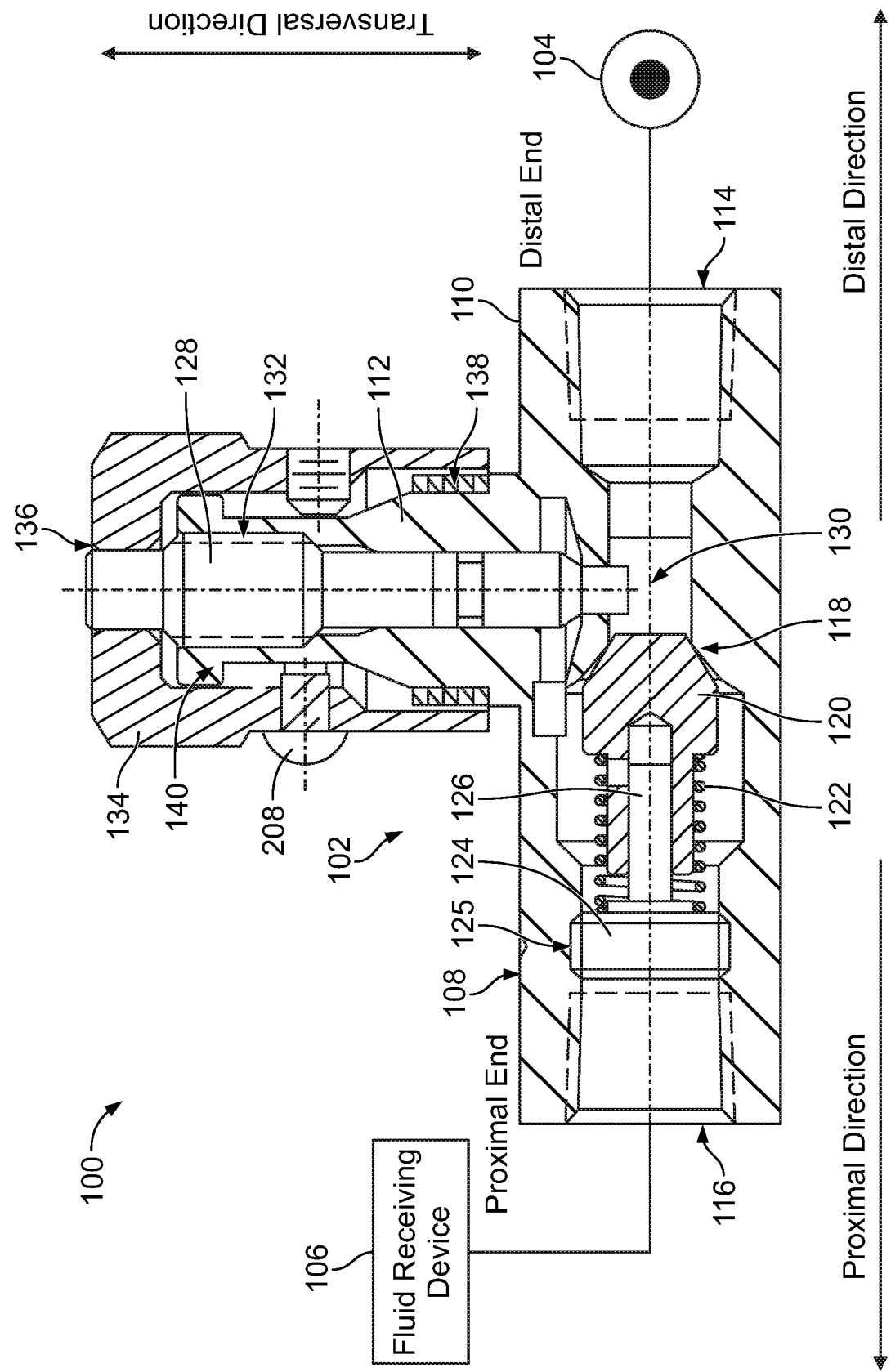
FIG. 1 illustrates a hydraulic system including a valve, in accordance with an example implementation.

FIG. 1 illustrates a hydraulic system 100 including a valve 102, in accordance with an example implementation. The valve 102 is configured to control fluid flow rate and fluid pressure from a source 104 of fluid (e.g., a pump or accumulator) to a fluid receiving device 106 (e.g., an actuator, another valve, etc.) disposed downstream of the valve 102.

The valve 102 includes a valve body 108. The valve body 108 can have a longitudinal body portion 110 and a transverse body portion 112. The transverse body portion 112 can also be referred to as a bushing. In the example implementation shown in FIG. 1, the transverse body portion 112 is substantially perpendicular to the longitudinal body portion 110; however, in other implementations, the transverse body portion 112 can be disposed at an angle (e.g., between 0 and 90 degrees) relative to the longitudinal body portion 110. Thus, the term "transverse" is used herein to indicate non-longitudinal, and is not limited to a 90 degrees implementation.

The longitudinal body portion 110 has a longitudinal cylindrical cavity therein. The longitudinal cylindrical cavity is configured to receive valve components therein and can include supporting surfaces and retaining features.

The longitudinal body portion 110 has an inlet port 114 formed at a first or distal end of the longitudinal body portion 110. The inlet port 114 is configured to be fluidly coupled to the source 104 of fluid, e.g., via a fluid line such as a hose or tube that can be threadedly coupled to the longitudinal body portion 110 at the inlet port 114. A second or proximal end of the longitudinal body portion 110 has an outlet port 116 configured to be fluidly coupled to the fluid receiving device 106, e.g., via a fluid line such as a hose or tube that can be threadedly coupled to the longitudinal body portion 110 at the outlet port 116.

In examples, as shown in FIG. 1, the inlet port 114 can be coaxial with and mounted opposite to the outlet port 116. However, in other examples, the ports 114, 116 might not be coaxial or mounted opposite to each other.

The longitudinal body portion 110 further comprises a poppet seat 118 configured as a protrusion on an interior peripheral surface of the longitudinal body portion 110. The valve 102 includes a poppet 120 that is biased by a biasing force of a spring 122 toward the poppet seat 118. Particularly, the poppet 120 can have a tapered exterior surface configured to interact with the poppet seat 118 to block fluid flow from the inlet port 114 to the outlet port 116 when pressure level of fluid at the inlet port 114 does not overcome the biasing force of the spring 122. The term "block" is used throughout herein to indicate substantially preventing fluid flow except for minimal or leakage flow of drops per minute, for example.

The valve 102 can include a spring cap 124 against which a proximal end of the spring 122 is secured. The spring cap 124 can, for example, be fixedly disposed within the longitudinally body portion 110 by way of being threadedly-engaged with an interior surface of the longitudinal body portion 110 at threaded region 125. The distal end of the spring 122 rests against a shoulder formed by the distal end of the poppet 120. With this configuration, the spring 122 is disposed about an exterior peripheral surface of the poppet 120 and biases the poppet 120 toward the poppet seat 118.

In examples, a poppet guide 126 can be coupled to or be integral with the spring cap 124 as depicted in FIG. 1. The poppet guide 126 extends from the spring cap 124 through a cavity formed within the poppet 120. This way, the poppet 120 is slidably accommodated about the exterior surface of the poppet guide 126. The poppet 120 can thus move or slide about the exterior surface of the poppet guide 126. This configuration allows the poppet 120 to be seated on and unseated off the poppet seat 118 smoothly and might eliminate distortion of the poppet seat 118 and the spring 122.

Further, the spring cap 124 has fluid passages that allow fluid flow therethrough. With this configuration, when pressure level of fluid supplied from the source 104 through the inlet port 114 overcomes the biasing force of the spring 122, the poppet 120 is unseated off the poppet seat 118, and fluid is allowed to flow around the poppet 120 and through the spring cap 124 then to the outlet port 116.

The transverse body portion 112 includes a transversal cavity therein. The transverse cavity of the transverse body portion 112 is disposed transverse to the longitudinal cavity of the longitudinal body portion 110 and is configured to house a needle 128. A tip (e.g., lower end) of the needle 128 forms a flow area or orifice 130 with the interior surface of the longitudinal body portion 110. The needle 128 is movable in a transversal direction within the transverse body portion 112 to change the size of the orifice 130, and thus change the fluid flow rate from the inlet port 114 to the outlet port 116. In other words, the orifice 130 is a variable orifice the size of which depends on the particular transversal position of the needle 128 with respect to the transverse body portion 112.

In an example, the needle 128 can have external threads formed on an exterior peripheral surface thereof. The transverse body portion 112 can in turn include internal threads formed on an interior peripheral surface thereof. External threads of the needle 128 can be threadedly engaged with the internal threads of the transverse body portion 112 at threaded region 132. With this configuration, rotating the needle 128 in a first rotational direction (e.g., clockwise) can cause the needle 128 to move in a first transversal direction (e.g., move downward in FIG. 1) to reduce the size of the orifice 130 (further restricts fluid flow therethrough), whereas rotating the needle 128 in a second rotational direction (e.g., counter-clockwise) can cause the needle 128 to move in a second transversal direction (e.g., move upward in FIG. 1) to increase the size of the orifice 130.

To facilitate rotating the needle 128, the valve 102 can include a handle or knob 134 that is rotatably coupled to the needle 128. For instance, the knob 134 can have a through-hole 136 configured to accommodate an end of the needle 128 (e.g., an upper end of the needle 128 in FIG. 1), and the knob 134 can be pressed-fitted to the end of the needle 128. Particularly, the through-hole 136 is configured to have a diameter relative to a respective diameter of the upper end of the needle 128 such that the knob 134 (and the knob 408 described below) can be press-fitted onto the needle 128. This way, the knob 134 is rotatably coupled to the needle 128 such that rotating the knob 134 causes the needle 128 to rotate therewith.

In examples, the valve 102 can include a plurality of indicator rings 138 disposed about an exterior peripheral surface of the transverse body portion 112 near an end of the knob 134. Each indicator ring of the plurality of indicator rings 138 might have a respective color that is different from respective colors of the other indicator rings. The plurality of indicator rings 138 provide visible check-points for setting the size of the orifice 130 and thus the fluid flow rate through the valve 102. The plurality of indicator rings 138 can also provide a reference point that allows the valve 102 to be accurately and quickly reset to a previous setting.

For example, the knob 134 and the needle 128 can be rotated so as to move the needle 128 upward and increase the size of the orifice 130. The number of indicator of rings of the plurality of indicator rings 138 and/or the color of the ring that becomes visible as the knob 134 moves upward provides a visual indication of the size of the orifice 130. This way, the larger the number of rings that are visible, the larger the size of the orifice 130, and vice versa. Also, as mentioned above, each ring may have a different color, and thus the color of the uppermost ring that is visible can also indicate the size of the orifice 130.

Figure 2:
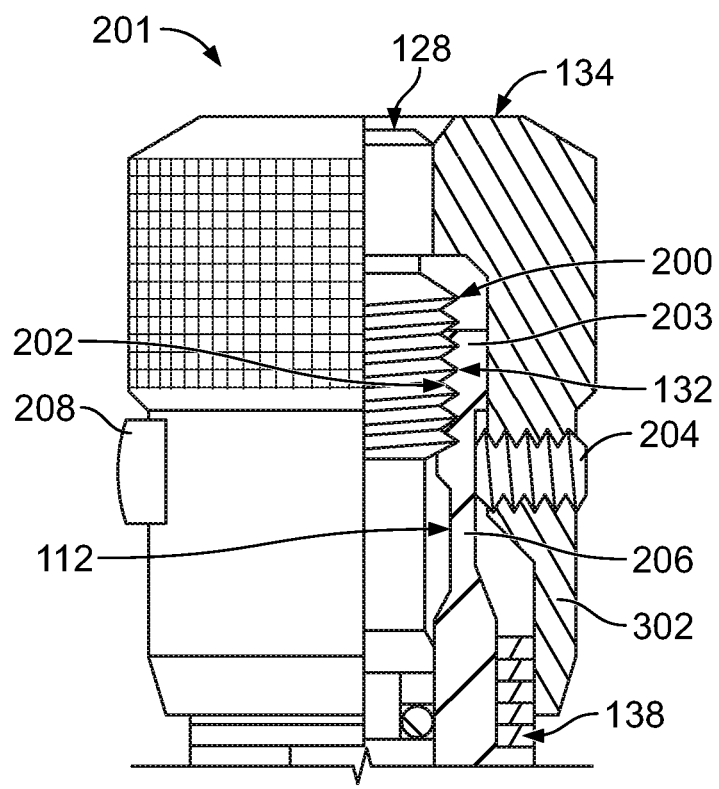
FIG. 2 illustrates a partial sectional view of a partial assembly of the valve in FIG. 1, in accordance with an example implementation.
Figure 3:
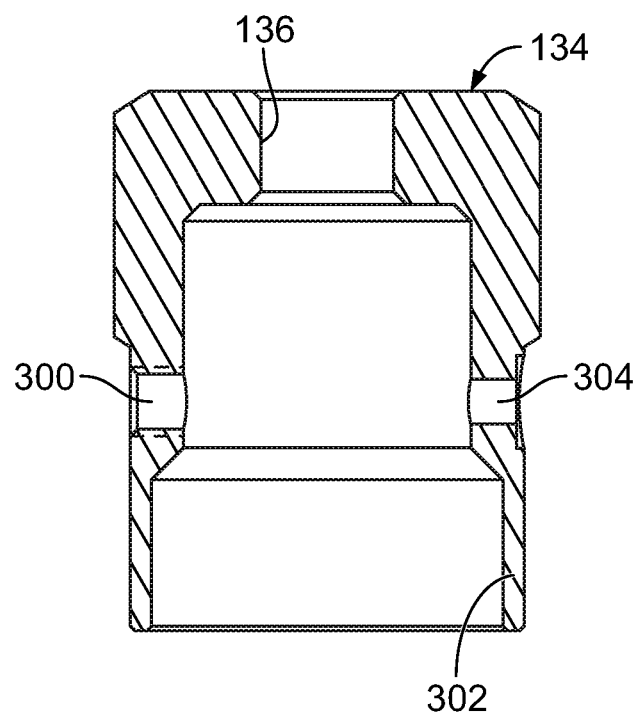
FIG. 3 illustrates a cross-sectional view of a knob, in accordance with another example implementation.

FIG. 2 illustrates a partial sectional view of a partial assembly 201 of the valve 102, and FIG. 3 illustrates a cross-sectional view of the knob 134, in accordance with an example implementation. As shown in FIG. 2, the needle 128 includes external threads 200 formed about the exterior surface of the needle 128 and configured to engage with internal threads 202 formed at an end 203 of the transverse body portion 112 at the threaded region 132. With this configuration, rotation of the knob 134 and the needle 128 adjusts the linear or transversal position of the needle 128 and the knob 134 and changes the number of rings of the plurality of indicator rings 138 that are visible.

In examples, it may be desirable to lock the knob 134 in a particular position once a desired flow rate is obtained through the valve 102. As such, referring to FIG. 3, the knob 134 can have a radial, threaded through-hole 300 formed laterally through a cylindrical wall 302 of the knob 134. Referring to FIGS. 2-3 together, the valve 102 can be configured to include a set screw 204 that can be threaded via the through-hole 300 through the knob 134 and can be configured to engage a central portion 206 of the transverse body portion 112.

Once the knob 134 and the needle 128 are rotated to a particular rotational position that corresponds to a desired flow rate setting for the valve 102, the set screw 204 can be threaded in the through-hole 300 until it contacts the central portion 206 of the transverse body portion 112, thereby locking the knob 134 at the particular rotational position. This way, the fluid flow rate through the valve 102 is set at a desired amount. If adjustments are requested, the set screw 204 can be unscrewed to disengage from the central portion 206 to allow the knob 134 to rotate, and then it can be screwed again to lock the knob 134 at the adjusted rotational position.

In some cases, an operator might unscrew the knob 134 and the needle 128 at the threaded region 132 all the way upward. In such cases, pressurized fluid flowing through the valve 102 can propel the knob 134 and the needle 128 in the transversal direction, causing them to be disassembled from the valve 102 and causing leakage from the valve 102.

To keep the knob 134 and the needle 128 within the transverse body portion 112 even when the knob 134 is unscrewed all the way, the valve 102 can further include a pin 208 (see FIGS. 1-2) that can be pressed in a through-hole 304 (see FIG. 3) formed in the cylindrical wall 302 of the knob 134. As such, the pin 208 can extend radially inward from the cylindrical wall 302 of the knob 134 and engage a flanged portion or shoulder 140 formed at the end 203 of the transverse body portion 112 as depicted in FIG. 1. The pin 208 can prevent the knob 134 and the needle 128 from being propelled in a transversal direction (e.g., upward in FIGS. 1-2). The pin 208 might not, however, press into the transverse body portion 112, like the set screw 204, that it prevents rotation of the knob 134. Rather, the pin 208 locks the knob 134 to the transverse body portion 112 of the valve body 108 in a transversal direction.

In some cases, the pin 208 might be removed intentionally or unintentionally from the valve 102, thereby increasing the likelihood that the knob 134 and the needle 128 might be disassembled during operation of the valve 102 in the hydraulic system 100. In other cases, the pin 208 might fail, e.g., the pin 208 might be sheared under pressure and might thus fail to prevent the knob 134 from being disassembled. As mentioned above, an operator can unscrew the knob 134 and the needle 128 from the valve 102 to the extent that under fluid pressure, the knob 134 and the needle 128 can be propelled from the valve 102 by the pressurized fluid. Therefore, it may be desirable to have an additional or alternative locking mechanism to ensure that the knob 134 and the needle 128 remain attached to the valve 102 even when the pin 208 is not engaged.

Figure 4:
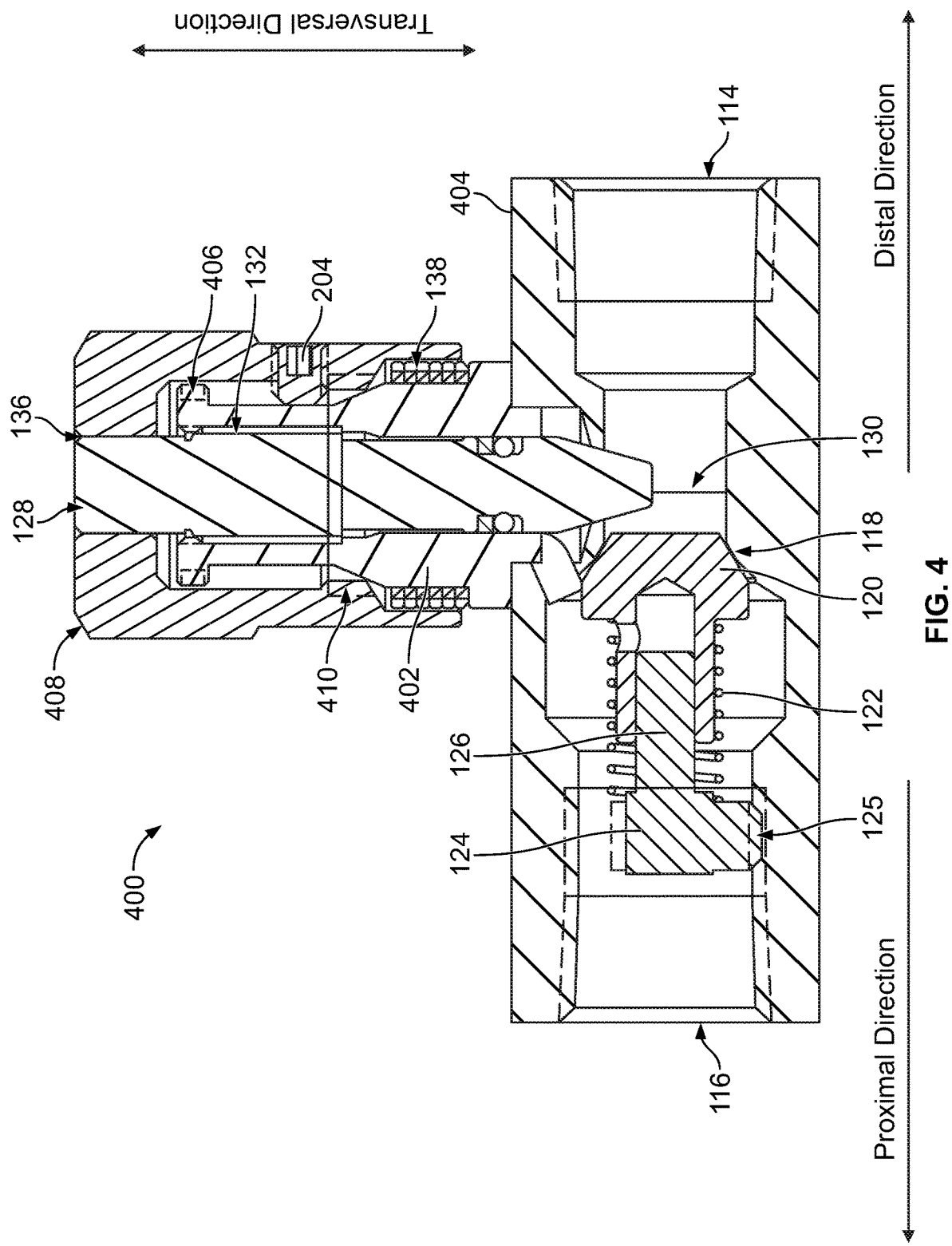
FIG. 4 illustrates a cross-sectional view of a valve, in accordance with an example implementation.

FIG. 4 illustrates a cross-sectional view of a valve 400, in accordance with an example implementation. The valve 400 includes some of the components and elements of the valve 102. Similar components and elements used in the valve 400 are designated with the same reference numbers as those used for the valve 102.

The valve 400 includes a transverse body portion 402 that might not be integral with a longitudinal body portion 404 as the valve 102. Rather, the transverse body portion 402 can be a separate component that is mounted to the longitudinal body portion 404. The transverse body portion 402 can also be referred to as a bushing that is mounted to the longitudinal body portion 404. However, it should be understood that in other example implementation the transverse body portion 402 can be integral with the longitudinal body portion 404 to form a unitary valve body similar to the valve body 108 of the valve 102.

The transverse body portion 402 differs from the transverse body portion 112 in that the transverse body portion 402 includes external threads 406 in addition to the internal threads 202 that engage with the external threads 200 of the needle 128 at the threaded region 132. The valve 400 also includes a knob 408 that differs from the knob 134. Particularly, the knob 408 includes internal threads 410 that are configured to threadedly engage with the external threads 406 of the transverse body portion 402.

Figure 5:
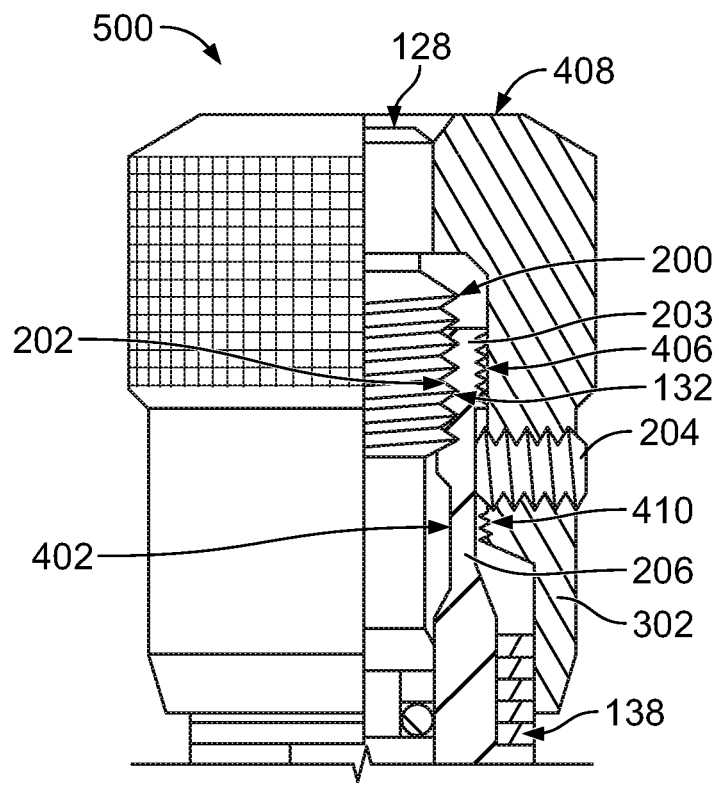
FIG. 5 illustrates a partial sectional view of a partial assembly of the valve in FIG. 4, in accordance with an example implementation.
Figure 6:
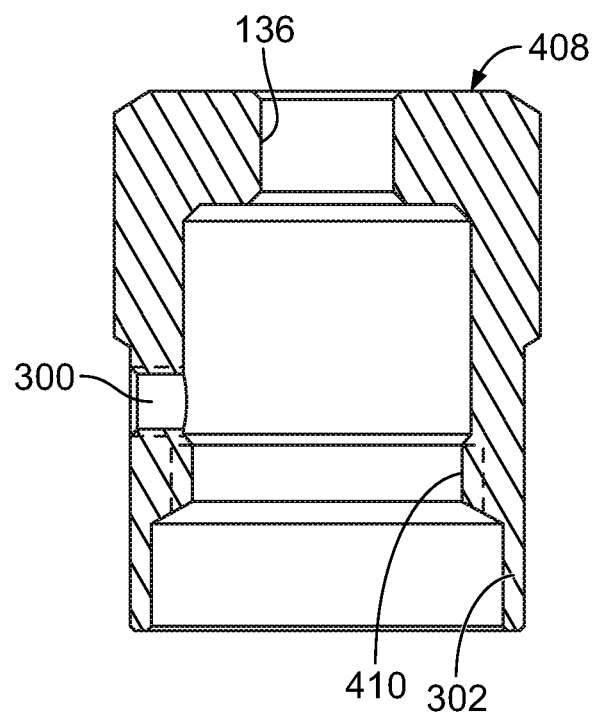
FIG. 6 illustrates a cross-sectional view of a knob, in accordance with an example implementation.

FIG. 5 illustrates a partial sectional view of a partial assembly 500 of the valve 400, and FIG. 6 illustrates a cross-sectional view of the knob 408, in accordance with an example implementation. As shown in FIG. 5, the end 203 of the transverse body portion 402 has the external threads 406 in addition to the threads 202, and the knob 408 has the internal threads 410.

During assembly of the valve 400, the knob 408 can be installed onto the transverse body portion 402 by (i) mounting the knob 408 to the transverse body portion 402 to facilitate threaded engagement between the external threads 406 and the internal threads 410, then (ii) rotating the knob 408 until the internal threads 410 of the knob 408 are past and below the external threads 406 of the transverse body portion 402 (e.g., until the internal threads 410 pass through the external threads 406 and move further downward). In other words, the internal threads 410 engage the external threads 406, and then disengage therefrom as the knob continues to move downward. At that point, the throughhole 136 of the knob 408 can be interfacing or aligned with the upper end of the needle 128, and the knob 408 can then be pressed onto the needle 128 so as to rotatably couple the knob 408 to the needle 128.

The helix of a thread can be configured to twist in two possible directions, and the configuration of the thread is referred to as the "handedness" of the thread. Threads that are oriented so that the threaded item (e.g., the knob 408 or the needle 128), when seen from a point of view on the axis through the center of the helix, moves away from the viewer when it is turned in a clockwise direction, and moves towards the viewer when it is turned counter-clockwise, are referred to as a right-handed (RH) threads, as such configuration follows the right hand grip rule. Threads oriented in the opposite direction are referred to as left-handed (LH) threads.

Notably, handedness of the threads 406, 410 are configured to be opposite of respective handedness of the external threads 200 of the needle 128 and the internal threads 202 of the transverse body portion 402. For example, the threads 406, 410 can be configured to have first-handedness (e.g., configured to be left-handed threads), whereas the external threads 200 of the needle 128 and the internal threads 202 of the transverse body portion 402 can be configured to have second-handedness (e.g., configured to be right-hand threads) or vice versa.

The features related to opposite-handedness of the threads may prevent the operator from being able to disassemble the knob 408 from the transverse body portion 402. As an example for illustration, an operator may attempt to disassemble the valve 400 by unscrewing the knob 408 and the needle 128 (e.g., by rotating them in a counter-clockwise direction). In an example, prior to disengagement of the external threads 200 from the internal threads 202 of the transverse body portion 402 at the threaded region 132, the threads 406, 410 can contact each other. Because the threads 406, 410 have opposite handedness compared to the threads 200, 202, as the operator continues to unscrew the knob 408 in the same direction (e.g., counter-clockwise), the improper engagement (i.e., not same-handedness) of the threads 406, 410 prevent further rotation of the knob 408 and needle 128 in the disassembly direction with respect to the transverse body portion 402. As such, this configuration can prevent the knob 408 and the needle 128 from being propelled unintentionally away from the valve 400 under fluid pressure.

Notably, during assembly of the valve 400, the knob 408 might not be initially attached or coupled to the needle 128. Rather, the needle 128 is first threaded into the transverse body portion 402 in a first rotational direction to move the needle 128 in the transversal direction (downward in FIGS. 4-5) sufficiently to allow the knob 408 to be threaded in a second rotational direction onto the transverse body portion 402 via the threads 406, 410 such that threads 410 pass through and disengage from threads 406. At such point, the upper end of the needle 128 can be positioned proximate to the through-hole 136 of the knob 408, and the knob 408 can then be pressed onto the needle 128. As an example, the first rotational direction can be a clockwise direction, and the second rotational direction can be a counter-clockwise direction; however, these directions can be reversed.

In an example implementation, the external threads 406 of the transverse body portion 402 and the internal threads 410 of the knob 408 can be formed to have a lead angle of 90 degrees and a helix angle of 0 degrees. In other words, the external threads 406 can be formed as spline teeth, while the internal threads 410 can be formed as spline slots or grooves. With this configuration, the knob 408 can be "slipped" onto the transverse body portion 402 in a linear direction where the knob 408 moves in a linear transversal direction (e.g., downward) and the spline configuration of the threads 406, 410 allow such linear movement between the knob 408 and the transverse body portion 402. However, the spline configuration of the threads 406, 410 does not allow relative rotation between the knob 408 and the transverse body portion 402. As such, the knob 408 can be mounted to the transverse body portion 402, the knob 408 can then be press-fitted to the needle 128. Then, when the needle 128 and the knob 408 are being unscrewed, prior to disengagement of the external threads 200 from the internal threads 202 of the transverse body portion 402 at the threaded region 132, the threads 406, 410 can contact each other and the spline configuration would prevent the knob 408 from rotating further.

In another example, rather than multiple spline teeth and spline grooves, one spline tooth and one spline groove can be used. It should be understand that either of the knob 408 or the transverse body portion 402 can have the spline teeth or tooth, while the other can have the spline groove.

In still another example, the knob 408 or the transverse body portion 402 can have a keyway (e.g., a slot cut in a part of the knob 408 or the transverse body portion 402), while the other can have a key mounted thereto. The key can have any configuration such as rectangular, square, parallel sunk, gib-head, feather, or Woodruff. Such key-keyway configuration (e.g., a keyed joint) can allow the knob 408 to be mounted to the transverse body portion 402 while being in a particular orientation, but can prevent the knob 408 from rotating relative to the transverse body portion 402. In another example, a double keyway configuration can be used where the knob 408 or the transverse body portion 402 can have two keyways and the other can have two keys.

In another example, rather than having a fully-circular interior surface, the knob 408 can be configured to have transversal portions of its interior surfaces configured as flat surfaces. On the other hand, the transverse body portion 402 can be configured to have a double-D configuration to have flat exterior surfaces corresponding to the flat interior surfaces of the knob 408. With this configuration, the knob 408 can be oriented in a particular orientation such that the flat surfaces of the knob 408 and the corresponding flat surfaces of the transverse body portion 402 are aligned. The knob 408 can then be moves in the transversal direction relative to the transverse body portion 402; however, when the flat surfaces are aligned, the knob 408 is precluded from rotating relative to the transverse body portion 402.

As such, the knob 408 can have an internal feature from any of the features mentioned above (e.g., the internal threads 410, one or more spline teeth or grooves, one or more keys or keyways, one or more portions having flat surfaces, etc.) and the transverse body portion 402 can have an external feature that corresponds to the internal feature of the knob 410. The internal feature of the knob 408 and the external feature of the transverse body portion 402 are configured to allow for transversal alignment and assembly between the knob 408 and the transverse body portion 402.

The internal feature of the knob 408 and the external feature of the transverse body portion 402 allow the internal feature of the knob 408 to pass linearly or transversely past the external feature of the transverse body portion 402 during assembly. However, they preclude the knob 408 from rotating relative to the transverse body portion 402 during disassembly or unscrewing of the knob 408 and the needle 128 prior to disengagement of the needle 128 from the internal threads 202 of the transverse body portion 402.

As depicted in FIG. 6, the knob 408 may further differ from the knob 134 in that the knob 408 might not include the through-hole 304 that accommodates the pin 208. In this case, the opposite handedness of the threads 406, 410 relative to the threads 200, 202 may be sufficient to preclude disassembly of the knob 408 and the needle 128. However, it should be understood that the knob 408 can be configured to have the through-hole 304, and the valve 400 may further include the pin 208 for redundancy or additional protection.

FIG. 7 is a flowchart of a method 700 for assembling a valve, in accordance with an example implementation. The method 700 shown in FIG. 7 presents an example of a method that can be used to assemble the valve 400, for example. The method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes placing the needle 128 of the valve 400 into a valve body (e.g., into the transverse body portion 402) of the valve 400, wherein the needle 128 comprises the external threads 200 formed in a first-handed direction, wherein the valve body comprises the internal threads 202 formed in the first-handed direction, wherein the valve body further comprises the external threads 406 formed in a second-handed direction.

At block 704, the method 700 includes rotating the needle 128 in a first direction, thereby causing the external threads 200 of the needle 128 to engage the internal threads 202 of the valve body to move the needle 128 in a linear direction (e.g., in the transversal direction) to a predetermined position with respect to the valve body (e.g., to control the size of the orifice 130).

At block 706, the method 700 includes positioning the knob 408 of the valve 400 onto the valve body, wherein the knob 408 comprises the internal threads 410 formed in the second-handed direction.

At block 708, the method 700 includes rotating the knob 408 in a second direction such that the internal threads 410 of the knob 408 engage and pass through the external threads 406 of the valve body.

At block 710, the method 700 includes, after the internal threads 410 of the knob 408 pass through the external threads 406 of the valve body and disengage therefrom, rotatably coupling the knob 408 to the needle 128 (e.g., press-fitting the knob 408 to the needle 128) such that rotation of the knob 408 in the first direction causes the needle 128 to rotate therewith, thereby moving the needle 128 in the linear direction and adjusting position of the needle 128 with respect to the valve body.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method of assembling a valve, the method comprising:

placing a needle of the valve into a valve body of the valve, wherein the needle comprises external threads formed in a first-handed direction, wherein the valve body comprises internal threads formed in the first-handed direction, wherein the valve body further comprises respective external threads formed in a second-handed direction;
rotating the needle in a first direction, thereby causing the external threads of the needle to engage the internal threads of the valve body to move the needle in a linear direction to a predetermined position with respect to the valve body;
positioning a knob of the valve onto the valve body, wherein the knob comprises respective internal threads formed in the second-handed direction;
rotating the knob in a second direction such that the respective internal threads of the knob engage and pass through the respective external threads of the valve body; and
after the respective internal threads of the knob pass through the respective external threads of the valve body and disengage therefrom, rotatably coupling the knob to the needle such that rotation of the knob in the first direction causes the needle to rotate therewith, thereby moving the needle in the linear direction and adjusting position of the needle with respect to the valve body.

2. The method of claim 1, wherein rotatably coupling the knob to the needle comprises:
press-fitting the knob onto the needle.

3. The method of claim 1, wherein the valve body comprises: (i) a longitudinal body portion having a longitudinal cavity, and (ii) a transverse body portion having a transverse cavity, wherein the transverse body portion comprises the internal threads and the respective external threads, wherein the needle is disposed in the transverse cavity and extends within the longitudinal body portion to form an orifice therein, wherein the method further comprises:
positioning a poppet in the longitudinal cavity such that the poppet is seated at a poppet seat formed by an interior surface of the longitudinal body portion.

4. The method of claim 3, further comprising:
placing a spring about an exterior surface of the poppet, such that the spring applies a biasing force on the poppet toward to the poppet seat.

5. The method of claim 4, further comprising:
positioning a spring cap within the longitudinal body portion, wherein a first end of the spring rests against the spring cap, whereas a second end of the spring contacts the poppet.

6. The method of claim 5, wherein the spring cap is threadedly coupled to the interior surface of the longitudinal body portion.

7. The method of claim 5, further comprising:
coupling a poppet guide to the spring cap, such that the poppet guide extends through a cavity formed within the poppet such that the poppet is slidably accommodated about the poppet guide.

8. The method of claim 3, further comprising:
placing a plurality of indicator rings about an exterior surface of the transverse body portion between the transverse body portion and an interior surface of the knob such that the knob covers at least some of the plurality of indicator rings, wherein changing a transversal position of the knob and the needle coupled thereto changes a number of indicator rings of the plurality of indicator rings that are visible, and wherein each indicator ring of the plurality of indicator rings has a respective color that is different from respective colors of other indicator rings.

9. A method comprising:
placing a needle of a valve into a valve body of the valve, wherein the needle comprises external threads, wherein the valve body comprises internal threads and an external feature;
rotating the needle, thereby causing the external threads of the needle to engage the internal threads of the valve body to move the needle in a linear direction to a predetermined position with respect to the valve body;
positioning a knob of the valve onto the valve body, wherein the knob comprises an internal feature;
causing the internal feature of the knob to engage and pass through the external feature of the valve body as the knob moves in the linear direction; and
after the internal feature of the knob passes through the external feature of the valve body and disengages therefrom, rotatably coupling the knob to the needle such that rotation of the knob causes the needle to rotate therewith, thereby moving the needle in the linear direction and adjusting position of the needle with respect to the valve body.

10. The method of claim 9, wherein the external threads of the needle and the internal threads of the valve body are formed in a first-handed direction, wherein the external feature of the valve body comprises respective external threads and the internal feature of the knob comprises respective internal threads, wherein the respective external threads of the valve body and the respective internal threads of the knob are formed in a second-handed direction.

11. The method of claim 10, further comprising:
rotating the knob and the needle; and
causing the respective internal threads of the knob to contact the respective external threads of the valve body prior to disengagement of the external threads of the needle from the internal threads of the valve body to prevent the needle and the knob from being removed from the valve body.

12. The method of claim 9, wherein the external feature of the valve body comprises one or more spline grooves and the internal feature of the knob comprises one or more spline teeth, such that the one or more spline teeth of the knob move through and past the one or more spline grooves of the valve body as the knob moves the linear direction relative to the valve body, wherein the knob and the needle are prevented from being removed from the valve body as the needle is rotated due to contact between the one or more spline teeth of the knob and the one or more spline grooves of the valve body.

13. The method of claim 9, wherein rotatably coupling the knob to the needle comprises:
press-fitting the knob onto the needle.

14. The method of claim 9, wherein the valve body comprises: (i) a longitudinal body portion having a longitudinal cavity, and (ii) a transverse body portion having a transverse cavity, wherein the transverse body portion comprises the internal threads and the external feature, wherein the needle is disposed in the transverse cavity and extends within the longitudinal body portion to form an orifice therein, wherein the method further comprises:
positioning a poppet in the longitudinal cavity such that the poppet is seated at a poppet seat formed by an interior surface of the longitudinal body portion.

15. The method of claim 14, further comprising:
placing a spring about an exterior surface of the poppet, such that the spring applies a biasing force on the poppet toward to the poppet seat.

16. The method of claim 15, further comprising:
positioning a spring cap within the longitudinal body portion, wherein a first end of the spring rests against the spring cap, whereas a second end of the spring contacts the poppet.

17. The method of claim 16, wherein the spring cap is threadedly coupled to the interior surface of the longitudinal body portion.

18. The method of claim 16, further comprising:
coupling a poppet guide to the spring cap, such that the poppet guide extends through a cavity formed within the poppet such that the poppet is slidably accommodated about the poppet guide.

19. The method of claim 14, further comprising:
placing a plurality of indicator rings about an exterior surface of the transverse body portion between the transverse body portion and an interior surface of the knob such that the knob covers at least some of the plurality of indicator rings, wherein changing a transversal position of the knob and the needle coupled thereto changes a number of indicator rings of the plurality of indicator rings that are visible, and wherein each indicator ring of the plurality of indicator rings has a respective color that is different from respective colors of other indicator rings.

* * * * *